Sept. 27, 1966 G. E. BRECHLING 3,275,941

A.C. TO D.C. CONVERTERS

Filed March 27, 1961

George E. Brechling
INVENTOR.

BY Michael P. Breston

3,275,941
A.C. TO D.C. CONVERTERS

George E. Brechling, Levittown, Pa., assignor to Electro-Mechanical Research, Inc., Sarasota, Fla., a corporation of Connecticut Filed Mar. 27, 1961, Ser. No. 98,409
3 Claims. (Cl. 329—101)

This invention relates to signal translating systems and more particularly to linear detectors for detecting signals having a large, dynamic range.

Demodulation of an amplitude-modulated wave may be readily accomplished by first rectifying the wave to obtain a variable direct current which, when applied to a filtering network, reproduces the modulation envelope of the wave. Rectification is ordinarily performed by a rectifying system employing either vacuum or gas tube diodes or, preferably, in miniaturized equipments, solid-state rectifiers. When the amplitude of a carrier signal is made to vary by a modulating intelligence signal over a large, dynamic range, it becomes exceedingly difficult to detect with exact fidelity the modulation envelope. The difficulties are primarily caused by at least three factors: (1) most solid state and some tube-type rectifying devices possess an inherent threshold value below which little or no rectification takes place; (2) this threshold fluctuates over a wide range of values with changes in temperature; and (3) when the signal to be rectified only slightly exceeds this threshold value, it is non-linearly detected; i.e., the graph representing the rectified voltage signal versus the amplitude of the resulting current is not a straight line. In addition, the non-linearities of the rectifying devices are usually compounded with the non-linearities of the subsequent stages following the rectifier network, such as the amplifying stage which, when employing transistors, for example, is likely to introduce variations in the detected intelligence signal caused by changes in the operating temperature range.

Consequently, when semiconductor rectifiers are employed to detect large-range signals, serious non-linear distortions result in the detected modulation envelope. Thus, the detected intelligence signal may include frequencies different from those contained in the modulation envelope, thereby giving rise to amplitude distortions. The detector may also discriminate against certain modulating frequencies, producing an output signal which depends upon the modulation frequency, and may thus introduce frequency distortion. Finally, the detector may reproduce the different frequency components of the modulation envelope with modified phase relationships, thus giving rise to phase distortion.

Accordingly, it is an object of the present invention to provide a new and improved alternating current to direct current converter having a wide, linear dynamic range.

It is another object of the present invention to provide a new and improved demodulating system which substantially eliminates amplitude, frequency, and phase distortions from the detected intelligence signal.

It is still another object of the present invention to provide a new and improved detecting system which exhibits no threshold value over a wide range of signal levels, which is substantially compensated for large changes in the operating temperature, which employs, a minimum of components, which is economical to assemble, and which provides an ouput voltage or current that is linearly related to the amplitude of the modulating intelligence signal over a wide dynamic range thereof.

These and further objects and advantages are accomplished by providing a current rectifying network including, at least one solid state rectifier for detecting the modulation envelope, a filter for smoothing out the detected envelope, and a high-input impedance, low-output impedance, emitter-follower transistor amplifier stage for providing a detected voltage or current signal which is substantially an exact replica of the modulation envelope. There is further provided, in accordance with an illustrative embodiment of this invention, a variable bias source to forward bias said rectifier and to control the base-emitter voltage drop of said transistor. The magnitude of the bias source being chosen to maintain the operating quiescent points of the rectifier and of the transistor in their respective linear operating regions, slightly above their respective threshold levels, so as to provide an output signal substantially devoid of amplitude, frequency, and phase distortions; the instantaneous amplitude of the bias source varying in magnitude and sense in tracking relation with the variations in said threshold levels.

The novel features of the present invention are set forth in the appended claims; additional objects and advantages will become apparent from the following detailed description when taken in conjunction with the accompanying drawings, in which:

Figures 1, 2, 3:
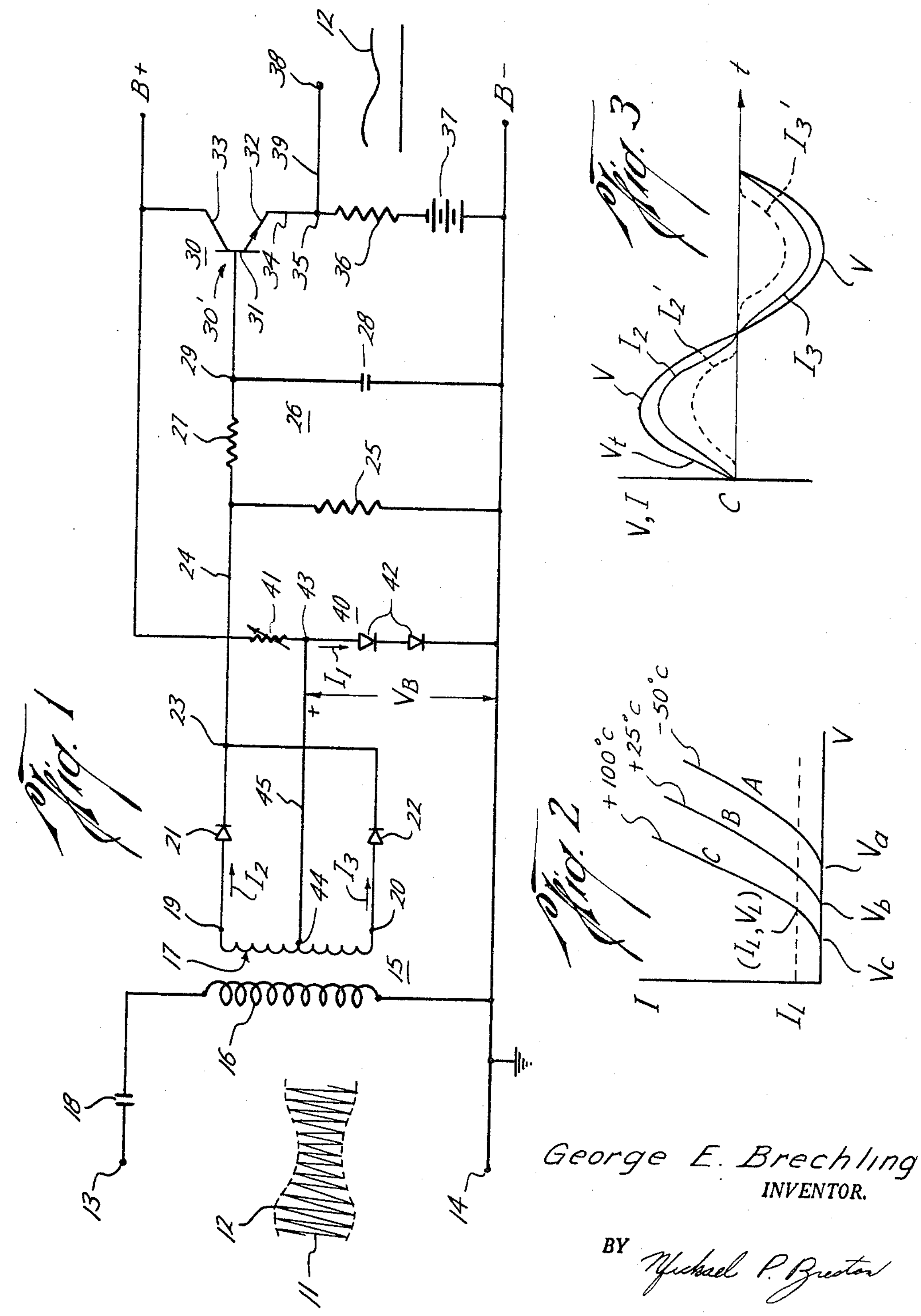
FIG. 1 is a schematic circuit diagram of a preferred embodiment of the new and improved detecting system in accordance with this invention.
FIG. 2 shows characteristic voltage-versus-current curves of forward-biased, solid-state rectifiers as a function of three typical operating temperatures.
FIG. 3 shows the relationship between the rectified voltage and the resulting current as a function of the threshold level in the rectifying network.

Referring to FIG. 1, the amplitude-modulated carrier wave 11 carrying a modulation envelope 12 is applied to the input terminals 13, 14 of a transformer 15 having a primary winding 16 and a center-tapped secondary winding 17. A direct current blocking capacitor 18 of negligible A.C. impedance is inserted between input terminal 13 and the upper terminal of primary winding 16. Terminal 14 is conveniently returned to a common bus wire, or to ground. The end terminals 19 and 20 of secondary winding 17 are interconnected by two oppositely poled rectifying elements 21 and 22 having a common junction 23. Elements 21, 22 are preferably solid-state rectifiers.

In FIG. 2 are shown current-versus-voltage characteristic curves A, B, and C of typical forward-biased, solid-state rectifiers, as a function of three representative operating temperatures −50° C., 25° C., and 100° C., respectively. For a given operating temperature, the rectifier current flows in an easy flow direction when the forward bias across the rectifier exceeds a characteristic threshold value. For example, at 100° C. the rectifier current will start to flow when the voltage across the rectifier exceeds a threshold value $V_c$. The value of $V_c$ increases progressively to $V_b$ and $V_a$, as the temperature respectively decreases from 100° C. to 25° C. and −50° C.

When the current starts to flow, the initial forward resistance of the rectifier is relatively very high. This resistance gradually decreases until the current reaches a typical value $I_L$. The portion of the curve, between the horizontal axis and a parallel line drawn through $I_L$, is known as the "square-law" region because rectified voltage signals whose amplitudes lie between the threshold value and $V_L$, corresponding to $I_L$, are detected in a "square-law" manner; i.e., a change $\Delta V$ in the signal voltage across the rectifier causes a current change $\Delta I$ which is substantially proportional to the square of $\Delta V$. Although square-law detection is useful for some purposes, for example, in the generation of harmonics, it is highly undesirable in telemetering, borehole logging, and other applications in which it is essential to be able to linearly detect amplitude-modulated waves over large, dynamic, amplitude ranges.

The portion of the curve above the $I_L$ line has a substantially constant slope and is known as the "linear" region, affording linear detection of the modulation envelope 12 on the carrier wave 11. As will be expalined in greater detail hereinafter, rectifiers 21 and 22 are sufficiently forward-biased in order that their operating quiescent points lie, preferably, above the $I_L$ line, i.e., the "linear" region.

Referring back to FIG. 1, junction 23 is connected to ground via lead 24 and load resistor 25. To smooth out the rectified D.C. current, a simple RC filter network 26 is connected across load resistor 25. It comprises a resistor 27 and a capacitor 28 connected to a common junction 29. To isolate the filter capacitor 28 from subsequent utilization devices and thereby prevent the draining of a portion of the detected current flowing through resistor 27 which would adversely affect the detection linearity, a buffer amplifier is provided, such as a high-input impedance, low-output impedance, emitter-follower amplifying stage 30 preferably including a single NPN junction transistor 30' having a base 31, an emitter 32 and a collector 33. The output terminal 29 of the RC filter network 26 is connected to the base 31; the emitter 32 is connected to ground via lead 34, junction 35, load resistor 36, and a fixed bias voltage source 37, the positive terminal of which is grounded. The collector 33 is connected to a suitable B+ voltage supply whose B— terminal is grounded. An output terminal 38 is connected to junction 35 via lead 39 for providing to subsequent stages, or to a utilization device (not shown), the detected modulation envelope 12.

The base-emitter junction of transistor 30' is forward-biased by fixed bias source 37 and its operation is analogous to a junction rectifier whose characteristic curves are also temperature dependent in a manner shown in FIG. 2. The quiescent potential at junction 35 is known as the "offset" voltage. Since the potential difference between the base 31 and the emitter 32 is variable with temperature, consequently, the "offset" voltage also drifts with changes in temperature.

To automatically compensate for the variable threshold levels of rectifying elements 21 and 22 and for the drifting "offset" voltage, a temperature-sensitive voltage divider 40 is connected between the B+ terminal and ground. It includes a variable (or fixed), high-valued resistor 41 and one or more rectifying elements 42, poled to conduct current in the forward direction from the B+ terminal to ground. The number of rectifying elements 42 should preferably be equal to the number of rectifying junctions encountered in series by the flow of the rectified current: for example, since during each half cycle of current flow only the rectifying junction of either diode 21 or 22 and the rectifying junction of the base-emitter of transistor 30' are encountered, only two elements 42 are required. Elements 42 are preferably of the same material as rectifiers 21, 22 and, therefore, their characteristic curves as a function of temperature are similar to those shown in FIG. 2. Junction 42 between resistor 41 and series-connected rectifiers 42 is connected to center tap 44 via a lead 45.

In an illustrative operation of the detecting system shown in FIG. 1, the B+ voltage supply causes a current $I_1$ to flow through rectifying elements 42 in the easy flow direction. Since the forward resistance of elements 42 is relatively very small, the magnitude of $I_1$ is determined by the values of the B+ voltage and of the resistor 41.

Junction 43 will therefore be above ground at a positive potential $V_B$, the amplitude of which is determined, at a specified operating temperature, by the employed number of series-connected rectifying elements 42. Bias voltage $V_B$ is selected to provide a forward bias, slightly greater than the threshold value, across each of the rectifying elements 21 and 22 and of the base-emitter junction of transistor 30' in order to establish their respective quiescent operating points on the linear portions of their characteristic curves.

The bias voltage $V_B$ is applied to forward-bias rectifying elements 21 and 22 through lead 45, secondary winding 17, lead 24, and resistor 25. Similarly, $V_B$ is applied to establish a forward bias across the base-emitter junction of transistor 30' through lead 45, secondary winding 17, lead 24, resistor 27, base 31, emitter 32, resistor 36, D.C. source 37 and back through ground. It should be noted that the net base-emitter voltage drop depends on the relative values of source 37 and of bias voltage $V_B$.

The drift control of the "offset" voltage at junction 35 is accomplished as follows: when the potential difference between base 31 and emitter 32 decreases with increasing temperatures, the bias voltage $V_B$ also decreases by an amount sufficient to maintain the net base-to-emitter potential difference substantially constant over a wide temperature range, and, when the base-emitter potential difference increases with decreasing temperatures, the bias voltage $V_B$ also increases to again maintain the base-to-emitter potential difference at a substantially constant value. Similarly, the changes in the biasing voltage $V_B$ simultaneously compensate for the changes in the respective threshold levels of rectifiers 21 and 22 so as to maintain therethrough a constant quiescent current having a value approximately equal to $I_L$.

In sum, when no signal is applied to the input terminals 13 and 14, a substantial current $I_1$ flows through the rectifying elements 42 to establish a bias voltage $V_B$ thereacross which provides temperature-variable forward biases across rectifying elements 21, 22 and across the base-emitter junction of transistor 30', thereby maintaining at the transistor output a drift free forward current substantially independent of temperature changes. Therefore, the provision of the bias voltage $V_B$ greatly extends the operating dynamic range of the detecting system inasmuch as no portion of the incoming signal 11 is initially wasted in overcoming the respective threshold levels of rectifiers 21 and 22 before any rectified current can start flowing in lead 24. Moreover, by maintaining the base-to-emitter voltage drop constant, no fluctuations result in the "offset" potential at the output terminal 38.

Now, when a carrier signal 11 is applied to the input terminals 13 and 14, a rectified current $I_2$ flows from terminal 19 to junction 23 during each positive half cycle of signal 11. Similarly, a current $I_3$ flows from terminal 20 to junction 23 during each negative half cycle of signal 11. Current $I_2$ flows from terminal 19 to center tap 44 through rectifier 21, lead 24, resistor 25, rectifying elements 42, junction 43, and lead 45. Similarly, current $I_3$ flows from terminal 20 to center tap 44 through rectifier 22, junction 23, lead 24, resistor 25, rectifying elements 42, junction 43, and lead 45. To assure that either current $I_2$ or $I_3$ can flow in the reverse direction through rectifying elements 42, the magnitude of current $I_1$ flowing in the forward direction through these elements should constantly be maintained at a value greater than the maximum expected value of either $I_2$ or $I_3$. In other words, the effect of either $I_2$ or $I_3$ when flowing is to merely decrease the magnitude of the current $I_1$ flowing in the forward direction. Hence, since rectifying elements 42 are always forward-biased, their impedance to the flow of either $I_2$ or $I_3$ is practically negligible.

Because rectifiers 21 and 22 are already forward-biased by voltage $V_B$, either current $I_2$ or $I_3$ starts to flow as soon as the incoming signal 11 crosses the zero axis, as shown in FIG. 3. Without the application of the bias voltage $V_B$, a portion of signal 11 would be wasted in initially overcoming the threshold levels of rectifiers 21, 22 and, hence, either $I_2$ or $I_3$ would only flow during a lesser time interval than 180°, depending upon the value of the threshold voltage $V_t$, as illustrated by the dotted curves $I_2'$ and $I_3'$.

Since the amplitude of the detected voltage developed across the load resistor 25 depends on the magnitude of the rectified currents, it will be appreciated that, in the absence of the bias voltage $V_B$, the detected voltage would not be directly related to the amplitude of the incoming signal. This would result in non-linear detection because the amplitude of the rectified currents flowing through resistor 25 would then depend upon the particular operating temperature and upon the amplitude of the carrier signal 11. For example, if the amplitude of signal 11 is small, between zero and $V_t$ and no bias voltage $V_B$ is applied, the entire signal would be consumed to produce a voltage drop, during each half cycle, across either rectifier 21 or 22, and no output current would flow through load resistor 25; and, if the amplitude of signal 11 is only slightly greater than the threshold value, only that portion thereof which is in excess of the threshold value would cause a flow of current through resistor 25. This current, however, would be proportional to the square of the amplitude of the effective voltage signal and, therefore, the total current through resistor 25, contributed by the portion of the signal in the "square-law" region and by the portion of the signal in the linear region, would be highly distorted and non-linear. By applying the bias voltage $V_B$, the distortions and non-linearities are eliminated, while simultaneously extending the dynamic range of the detector, i.e., making it capable of linearly detecting small- as well as relatively large-amplitude, incoming signals.

Either current $I_2$ or $I_3$ flows through resistor 25 in the same sense and develops a pulsating voltage thereacross which is applied to the RC filter 26. The time constant of resistor 27 and of capacitor 28 is selected so that the voltage apearing across capacitor 28 varies substantially in correspondence with the modulation envelope 12 on signal 11. The demodulation intelligence signal across capacitor 28 is applied to the high-input impedance, emitter-follower amplifier stage 30 which linearly reproduces the modulation envelope 12 at the output terminal 38. Since the output impedance of amplifier 30 is relatively very low, the output detected signal appears as if generated by a voltage source of low internal impedance. Consequently, utilization devices connected to output terminal 38 will not tend to distort the linearity of the detected intelligence envelope.

Thus, the objects of the present invention have been effectively accomplished by the employment of a temperature-sensitive bias voltage to simultaneously preset the operating points of rectifiers 21, 22 and of transistor 30', thereby increasing the efficiency of rectification over a large, dynamic range of incoming signals, and simultaneously reducing the temperature dependence of the rectifying elements and of the amplifying circuit.

The choice of the circuit elements employed in the embodiment of FIG. 1 is subject to wide variations. Merely to exemplify the practice of this invention and not in restriction of its scope, the following set of values is given:

| | |
|---|---|
| B+ voltage supply | 20 volts. |
| D.C. source **37** | —5.5 volts. |
| Transistor **30'** | 2N760. |
| Rectifiers **21** and **22** | 1N482. |
| Rectifiers **42** | 1N482. |
| Capacitors **18** and **28** | 1.0 microfarad. |
| Resistor **41** | 22K. |
| Resistors **25** and **27** | 47K. |
| Resistor **36** | 10K. |
| Transformer **15** | DO–T38, 2K primary and 10K C.T. secondary. |

With the foregoing parameters, signals having a modulation index up to one, and peak-to-peak values ranging from 1 millivolt to 10 volts were linearly detected. The detection linearly remained better than 0.2% throughout the entire signal range.

Although the illustrative embodiment has been described in conjunction with a detector-amplifier circuit, it will be obvious to a man skilled in the art from reading the above disclosure that the invention is not so limited and that it will find various other uses such as in A.C. to D.C. converters, in metering, mixing, and descriminating circuits, etc. Therefore, it will be understood that various modifications may be made which are within the true spirit and scope of this invention as defined in the appended claims.

What is claimed is:

1. In a wide-range amplitude detector, the combination comprising: a first, second and third semiconductor elements each having a forward operating range wherein its resistance is relatively high below a characteristic threshold voltage level thereacross and is relatively low above said threshold level; a transformer having a primary winding and a center-tapped secondary winding, means connecting said first and said second elements in oppositely poled directions across said secondary winding a current-limiting impedance connected to said first and second elements, and means connecting said third element and said impedance in series across a direct current source for establishing a forward bias voltage across said third element, means to apply said bias voltage to forward bias said first and said second elements, and means coupled with said first and said second elements for deriving a direct current signal which varies as a function of the amplitude modulations on an alternating current signal applied to said primary winding.

2. In a wide-range amplitude detector, the combination comprising: a full-wave rectifying network including two parallel paths, each path including a semiconductor diode; a semiconductor element, a current-limiting impedance connected in series with said two parallel paths, means connecting said semiconductor element and said impedance in series across a direct current source for establishing a forward bias voltage across said semiconductor element; means for applying said bias voltage to each of said parallel paths, means coupled to said network and responsive to an alternating current signal to alternately produce a flow of rectified current through each parallel path; and, means coupled to said network and responsive to said flow of rectified current for deriving a direct current potential which varies as a function of the amplitude of said alternating current signal.

3. An A.C. to D.C. converter comprising: a full-wave rectifying network including two parallel paths, each path including a semiconductor diode; a semiconductor element having a current-versus-voltage characteristic substantially similar to the current-versus-voltage characteristic of said diodes; a current-limiting resistor connected in series with said two parallel paths, means connecting said element in series with said current limiting resistor across a direct current source for establishing a forward bias voltage across said element; a load resistor for receiving the output rectified currents from said rectifying network, an RC filter connected to said load resistor; an emitter-follower amplifier including a transistor having a base, a collector, and an emitter; means connecting the output of said filter to the input circuit of said amplifier; and, means for applying said bias voltage to forward bias said diodes and to forward bias the base-emitter junction of said transistor.

(References on following page)

References Cited by the Applicant

UNITED STATES PATENTS

| | | | |
|---|---|---|---|
| 2,751,550 | 6/1956 | Chase | 307—88.5 |
| 2,802,071 | 8/1957 | Lin | 307—88.5 |
| 2,941,076 | 6/1960 | Congdon et al. | 329—101 X |
| 2,964,655 | 12/1960 | Mann | 307—88.5 X |
| 3,022,457 | 2/1962 | Doan | 307—88.5 X |
| 3,079,562 | 2/1963 | Elliott | 329—101 |

OTHER REFERENCES

Electronic Design: April 1955, Saunders, "Designing Reliable Transistor Circuits—II," pp. 36–39 (see FIG. 5 and page 36, col. 1).

ROY LAKE, *Primary Examiner.*

ROBERT H. ROSE, *Examiner.*

A. L. BRODY, *Assistant Examiner.*